United States Patent [19]

Hartselle, III

[11] Patent Number: 5,767,456
[45] Date of Patent: Jun. 16, 1998

[54] POSTAL SCALE

[76] Inventor: William Hartselle, III, 15 Woodland Trail, Newnan, Ga. 30263

[21] Appl. No.: 628,927

[22] Filed: Apr. 8, 1996

[51] Int. Cl.[6] .............................. G01G 19/56; G01G 1/18
[52] U.S. Cl. .................... 177/148; 177/171; 177/190; 177/191; 177/201; 177/246
[58] Field of Search ................................ 177/126, 127, 177/148, 149, 190, 191, 197, 201, 246, 171

[56] References Cited

U.S. PATENT DOCUMENTS

| | | | |
|---|---|---|---|
| 440,959 | 11/1890 | O'Marra | 177/126 |
| 2,284,526 | 5/1942 | Linsley | 177/148 |
| 2,949,287 | 8/1960 | Linsley | 177/148 |
| 3,057,421 | 10/1962 | Fann | 177/246 X |
| 3,135,344 | 6/1964 | Olyphant, Jr. | 177/246 X |
| 3,224,516 | 12/1965 | Steizer | 177/148 |
| 3,786,885 | 1/1974 | Mills | 177/148 |
| 3,830,322 | 8/1974 | Mills | 177/148 |
| 4,368,791 | 1/1983 | Jackson | 177/148 |
| 4,384,629 | 5/1983 | Kotzin | 177/224 |
| 4,485,881 | 12/1984 | Tramposch et al. | 177/211 |
| 4,522,277 | 6/1985 | Kotzin | 177/250 |
| 4,840,241 | 6/1989 | Ishikawa | 177/148 |
| 4,961,472 | 10/1990 | Pratt | 177/148 |
| 5,696,355 | 12/1997 | Waltho | 177/126 |

FOREIGN PATENT DOCUMENTS 586896  4/1977  Switzerland.

Primary Examiner—Michael L. Gellner
Assistant Examiner—Randy W. Gibson

[57] ABSTRACT

A portable postal scale for determining whether the weight of a letter exceeds the maximum for a given amount of postage, for example, one ounce. The scale comprises an elongated beam having a letter holding means, a fulcrum and a preloaded portion. The letter holding means comprises two upward facing arms forming a narrow opening or slot for holding the letter to be weighed in an upright position. The part of the beam from the fulcrum to the end opposite the letter holding means is the preloaded portion; the preloaded portion has sufficient weight to balance the beam when a letter of predetermined weight is placed in the slot. A calibration means for the beam and longitudinally located recesses made suitable to accept a movable counterweight for determining additional increments of weight are provided in other embodiments.

21 Claims, 3 Drawing Sheets

POSTAL SCALE

FIELD OF THE INVENTION

This invention describes a portable postal scale for determining the correct amount of postage required for letters.

BACKGROUND OF THE INVENTION

Lightweight portable postal scales serve a useful function for postal patrons who do not have access in their home or work areas to more complicated platform scales available at post offices and elsewhere. In particular, a portable postal scale enables the user to determine whether the weight of a letter exceeds a maximum value such as one ounce.

All of the prior art present various limitations and disadvantages. Many of the devices in the prior art have multiple components which make the accuracy of a scale more difficult to achieve in the manufacturing process. Other devices require coins to balance beams; coins have varying weight tolerances themselves which again affect the accuracy of a scale. Devices that require placement of a letter horizontally at a predetermined location on a beam introduce inaccuracy to the weighing function because of variances in the center of gravity from one letter to another with equal outside dimensions. Still other devices require letters being weighed to be hung over the side of a desk or other work surface. During the weighing function, these devices can fall from the desk damaging the letter or the device and making repeat weighing trials awkward.

The present invention is provided to overcome these limitations and disadvantages.

SUMMARY OF THE INVENTION

The present invention is that for a portable postal scale employing an elongated balance beam. The beam comprises a letter holding means, a fulcrum and a preloaded portion. The letter holding means comprises two arms connected to the top surface of the beam near one end which form an upward facing narrow opening or slot for holding a letter to be weighed in an upright position. The slot maintains the center of gravity of the letter at a predetermined distance from the fulcrum. A traverse fulcrum is located on the bottom side of the beam. The preloaded portion of the beam is that part from the fulcrum to the second end. It has sufficient weight to balance the beam when a letter of predetermined weight is placed in the letter holding means. To initially position the beam for the weighing function, a stop is provided at the end of the preloaded portion on the bottom side.

To use the scale, a letter to be weighed is placed in the slot of the letter holding means, the beam is placed on a flat level surface and the stop is made to rest against the flat surface. When the scale is released, no movement indicates that the letter weight is less than the predetermined amount; tipping indicates that the weight is greater. By knowing the weight of a letter, the proper postage can then be determined.

A second embodiment of the invention provides a plurality of longitudinally located recesses in the top surface of the beam made suitable to accept a movable counterweight for positioning in any one of the recesses. This feature permits measuring several different increments of weight using one scale. A third embodiment of the invention provides a beam with a calibration means such as a screw movable through an aperture in the fulcrum. With a known weight placed in the letter holding means, the beam can be made to balance by adjustment of the calibration screw. A fourth embodiment of the invention provides a beam with both a calibration means and the recesses for measuring additional increments of weight.

DESCRIPTION OF THE PREFERRED EMBODIMENTS

Figure 1:
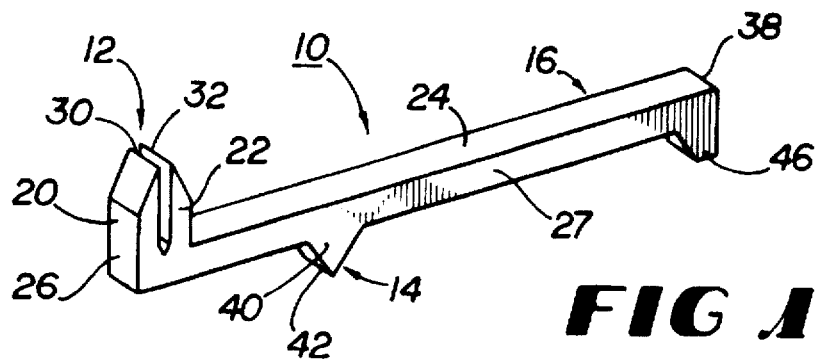
FIG. 1 is a perspective view of the preferred embodiment of the balance beam as described in the invention.
Figure 2:
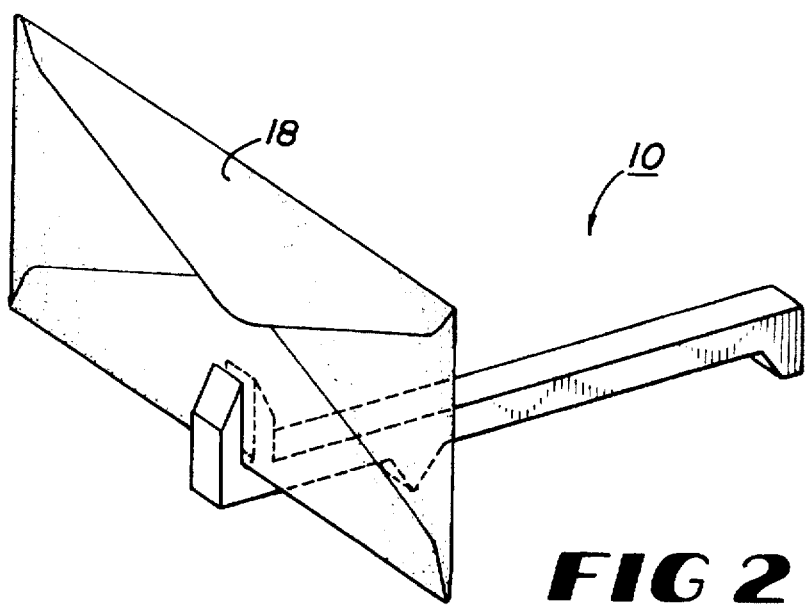
FIG. 2 is a perspective view of the beam of FIG. 1 with a letter present in the letter holding means.
Figure 3:
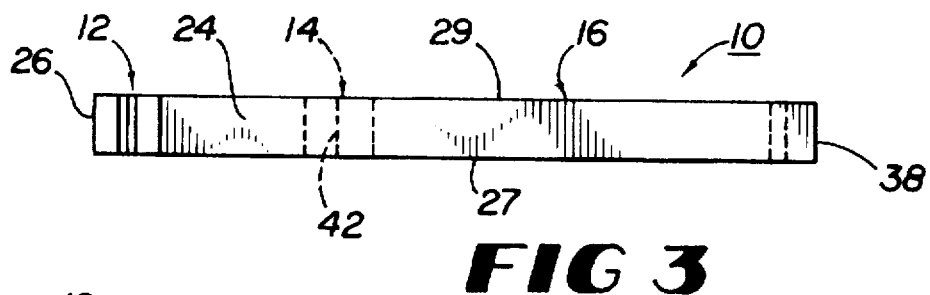
FIG. 3 is a top plan view of the beam of FIG. 1.

FIGS. 1, 2, 3 and 4 show a portable postal scale employing an elongated balance beam 10. FIG. 2 shows the beam 10 with a letter 18 in position for weighing. The beam 10 comprises a letter holding means 12, a fulcrum 14 and a preloaded portion 16.

The letter holding means 12 comprises two upward facing arms 20 and 22 forming a narrow opening or slot therebetween. The arms are connected to the top surface 24 of the elongated beam 10 near a first end 26 and may be integrally formed with the beam. The bottom 28 of the slot formed between the arms 20 and 22 is "V" shaped to receive the bottom of a letter thereby centering the letter in the opening and maintaining the precise length of the moment arm from the fulcrum 14. The length of this moment arm is critical to the weighing accuracy of the scale. The two arms 20 and 22 are of equal height and have sloping tops which peak along horizontal, traverse lines 30 and 32 formed where the tops intersect the sides 34 and 36 of the arms facing the opening. The purpose of having the arms 20 and 22 terminate in such a manner is to facilitate weighing letters that are either too wide to fit into the letter opening or that are too tall or too flexible to stand upright in the opening. A letter such as this may be weighed on the scale by centering it over the opening and by placing it horizontally on the upper edges 30 and 32 of the arms 20 and 22. The scale can therefore weigh a wide variety of letter sizes.

A fulcrum 14 located between the two ends 26 and 38 of the beam 10 is connected to the bottom surface 25 of the beam. The fulcrum 14 which is oriented generally traverse to the longitudinal axis of the beam 10 comprises a body 40 having a baseline 42. The baseline 42 is that specific line on the fulcrum 14 about which the beam 10 rotates during the weighing function. The baseline may be at a fixed location on the fulcrum or, where the fulcrum has a curved bottom surface, may be a line which moves as the beam rotates. The fulcrum 14 may be integrally formed with the beam 10 or may be a separate member attached to the beam.

Figure 4:
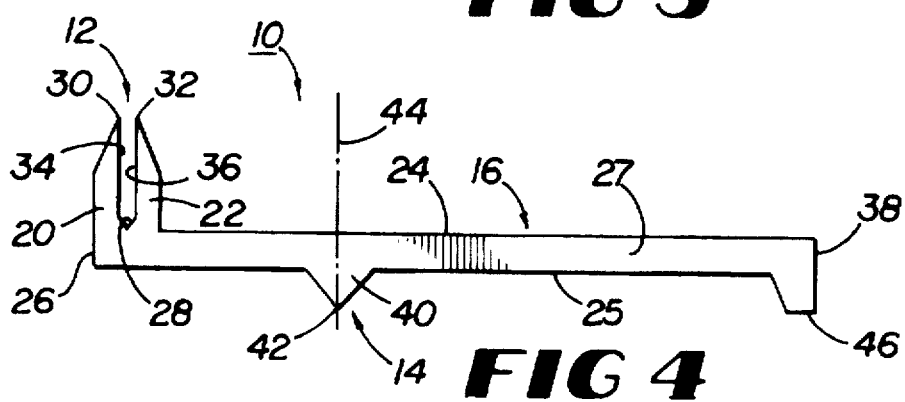
FIG. 4 is a side elevation view of the beam of FIG. 1.

As shown in FIG. 4, the preloaded portion 16 of the beam 10 comprises that portion from a vertical plane 44 through the fulcrum baseline 42 to the second end 38 of the beam. The weight of the preloaded portion 16 is sufficient to balance the beam 10 when a letter 18 of predetermined weight is placed in the letter holding means 12. In the preferred embodiment as shown in FIG. 4, a "stop" 46 is connected to the bottom side 25 of the preloaded portion 16 of the beam near its end 38. The height of the stop 46 is sufficient to position the longitudinal axis of the beam in a generally horizontal orientation and, more particularly, to position the opening in the letter holding means 12 in a vertical orientation. Thereby, the center of gravity of a letter in the letter holding opening is initially maintained a defined distance horizontally from a plane 44 through the fulcrum baseline 42.

To use the scale, a letter 18 to be weighed is placed in the slot of the letter holding means 12. The beam 10 is placed on a smooth, level surface with the "stop" 46 resting against the surface. When the beam 10 is released to begin the weighing function, no pivotal movement indicates the letter weight is less than the predetermined amount; tipping indicates the weight is greater. Since the work surface may not always be precisely level, a second trial should be made with the beam 10 rotated end for end. The same results confirm the weight.

Figure 5:
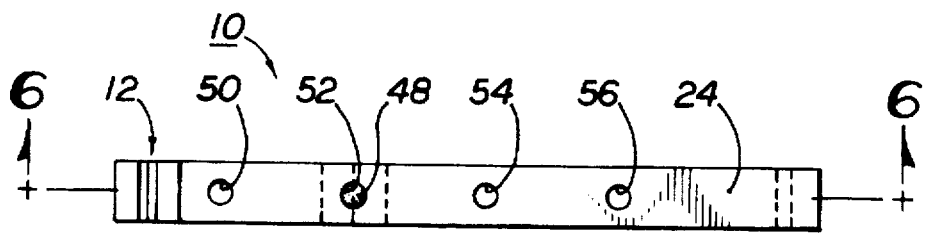
FIG. 5 is a top view of a second embodiment of the invention having longitudinally located recesses in the top surface of the beam for use with a counterweight to measure additional increments of weight.
Figure 6:
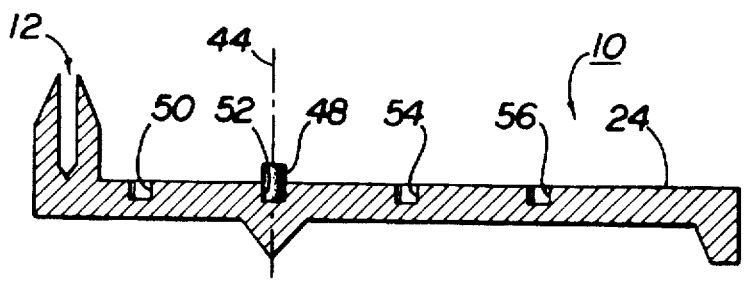
FIG. 6 is a sectional view taken along line 6—6 of FIG. 5.

FIGS. 5 and 6 show a second embodiment of the invention wherein apertures 50, 52, 54 or 56 which are longitudinally spaced apart along the top surface 24 of the beam 10 are provided suitable to receive a movable and mating counterweight 48. This permits using one scale to measure several different increments of postal weight. One weight, such as one ounce, can be measured with the counterweight 48 located in the aperture 52 directly above the fulcrum baseline. For greater amounts such as one and one-half and two ounces, the counterweight 48 can be placed in apertures 54 or 56, respectively, and, for a lesser amount such as one-half ounce, it can be placed in aperture 50.

Figure 7:
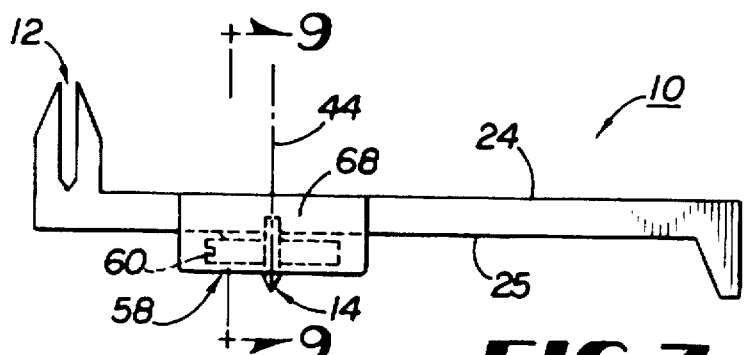
FIG. 7 is a side elevation view of a third embodiment of the invention having a calibration means.
Figure 8:
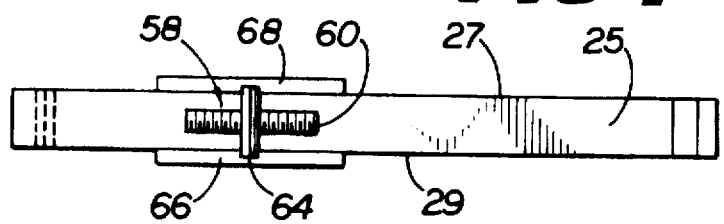
FIG. 8 is a bottom view of the beam of FIG. 7.
Figure 9:
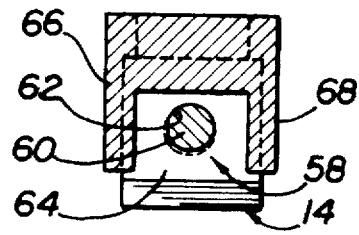
FIG. 9 is an enlarged sectional view taken immediately to the side of an insert as shown by line 9—9 of FIG. 7.

FIGS. 7, 8 and 9 show a third embodiment of the invention wherein a means 58 is provided for calibration of the beam 10. An initial calibration of a new beam may be necessary to adjust for weighing inaccuracy created by variations in the manufacturing process. In the preferred embodiment, the calibration means 58 comprises a screw 60 movable through an aperture 62 in a plate 64 which is attached to the beam 10 and which serves as the fulcrum 14. To accomplish calibration, a known weight is placed in letter holding means 12 and the screw 60 is rotated in one direction or the other until the beam 10 balances. Rotating the screw 60 causes some of the screw weight to shift from one side of the fulcrum 14 to the other thereby changing the moments about the fulcrum. Two walls 66 and 68 which are connected to or integral with the beam 10 are located along the sides of the screw 60 to protect it after calibration. The screw remains accessible from the bottom side and from both ends. A screwdriver can therefore be placed in the slot of the screw head to facilitate its adjustment.

Figure 10:
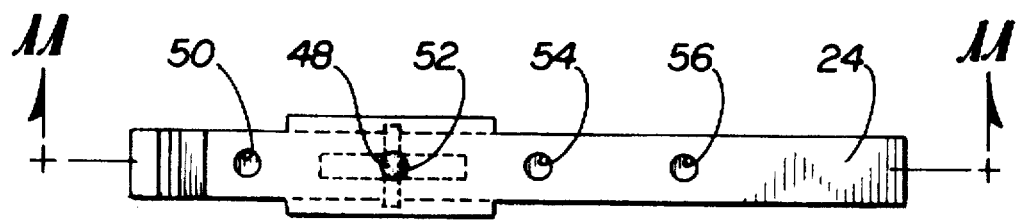
FIG. 10 is a top view of a fourth embodiment of the invention having both a calibration means and longitudinally located recesses in the top surface of the beam.
Figure 11:
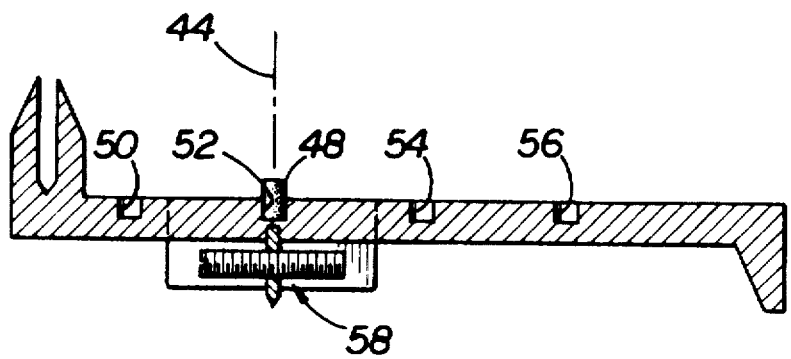
FIG. 11 is a sectional view taken along line 11—11 of FIG. 10.

FIGS. 10 and 11 show a fourth embodiment of the invention which comprises both a calibration means 58 and longitudinally located recesses 50, 52, 54 and 56 for use with a counterweight 48 in measuring additional increments of weight. The calibration means 58 comprises a screw movable through an aperture in the fulcrum as described for FIGS. 7, 8 and 9; likewise, the calibration means functions in the same manner as described for these figures.

Figure 12:
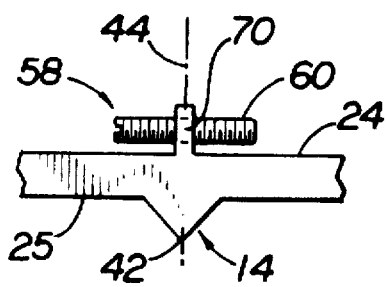
FIG. 12 is an elevation view of a portion of the beam at the fulcrum showing an alternate location for the calibration means on the top of the beam.
Figure 13:
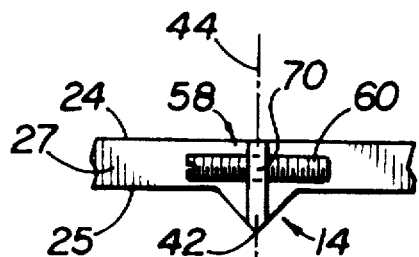
FIG. 13 is an elevation view of a portion of the beam at the fulcrum showing an alternate location for the calibration means on the side of the beam.

FIGS. 12 and 13 show alternate locations for the calibration means 58 on the top 24 or side 27, respectively, of the beam. Each figure shows a traversely oriented flange 70 on the top 24 or side 27, respectively, of the beam. The flange 70 is located approximately parallel to a vertical plane 44 through the fulcrum baseline 42. FIGS. 12 and 13 show the flange 70 located on the vertical plane 44; however, it should be understood that the flange 70 need not be located precisely on the vertical plane but can be located a slight distance to either side of the plane. A screw 60 is movable through an aperture in the flange 70 to facilitate calibration. The calibration means functions in the same manner as described for FIGS. 7, 8 and 9.

Although the invention is described above in terms of specific embodiments, it is not to be as limited thereto but is limited only by the following claims.

What is claimed is:

1. A postal scale for use on a generally level surface for determining whether the weight of a letter exceeds a predetermined amount comprising:

an elongated beam having a top surface, a bottom surface, a first end, a second end, a letter holding means, a fulcrum and a stop, wherein said letter holding means is connected to said top surface of said beam near said first end, wherein said fulcrum is connected to said bottom surface of said beam and has a baseline, wherein said stop protrudes from said bottom surface of said beam near said second end, wherein the height of said stop is such that when a letter is positioned in said letter holding means and when said fulcrum baseline and said stop rest on the generally level surface, the letter is held in a generally vertical orientation, and wherein the portion of said beam from said fulcrum to said second end has sufficient weight to balance said beam when a letter of predetermined weight is placed in said letter holding means.

2. The scale as defined in claim 1 wherein said letter holding means comprises two arms having sides forming an upward facing narrow opening.

3. The scale as defined in claim 2 wherein said arms of said letter holding means are of equal height and have sloping tops which terminate along horizontal, traverse lines formed where said tops intersect said sides of said arms facing said opening.

4. The scale as defined in claim 2 wherein the bottom of said opening is "V" shaped.

5. The scale as defined in claim 2 wherein said beam and said arms are integrally formed.

6. The scale as defined in claim 1 wherein said beam and said stop are integrally formed.

7. The scale as defined in claim 1 further comprising a plurality of recesses formed in said top surface of said beam wherein said recesses are located at positions longitudinally along said beam and wherein said recesses are suitable for accepting a counterweight which may be removably placed in any one of said recesses.

8. A postal scale for use on a generally level surface for determining whether the weight of a letter exceeds a predetermined amount comprising:

an elongated beam having a top surface, a bottom surface, two side surfaces, a first end, a second end, a letter holding means, a fulcrum, and a calibration means, wherein said letter holding means is connected to said top surface of said beam near said first end, wherein said fulcrum is connected to said bottom surface of said beam and has a baseline, wherein said calibration means is operative to shift weight from one side of said fulcrum to the other side of said fulcrum, and wherein the portion of said beam from said fulcrum to said second end has sufficient weight to balance said beam when a letter of predetermined weight is placed in said letter holding means.

9. The scale as defined in claim 8 wherein said calibration means comprises a screw movable through an aperture in said fulcrum.

10. The scale as defined in claim 8 wherein said beam further comprises a traversely oriented flange located on said top surface of said beam wherein said flange is located near said fulcrum.

11. The scale as defined in claim 10 wherein said calibration means comprises a screw movable through an aperture in said flange.

12. The scale as defined in claim 8 wherein said beam further comprises a traversely oriented flange located on one of said side surfaces of said beam wherein said flange is located near said fulcrum.

13. The scale as defined in claim 12 wherein said calibration means comprises a screw movable through an aperture in said flange.

14. The scale as defined in claim 8 further comprising a stop which protrudes from said bottom surface of said beam near said second end.

15. The scale as defined in claim 8 wherein said letter holding means comprises two arms having sides forming an upward facing narrow opening.

16. The scale as defined in claim 15 wherein said arms of said letter holding means are of equal height and have sloping tops which terminate along horizontal, traverse lines formed where said tops intersect said sides of said arms facing said opening.

17. The scale as defined in claim 15 wherein the bottom of said opening is "V" shaped.

18. The scale as defined in claim 15 wherein said beam and said arms are integrally formed.

19. The scale as defined in claim 14 wherein said beam and said stop are integrally formed.

20. The scale as defined in claim 8 further comprising a plurality of recesses formed in said top surface of said beam wherein said recesses are located at positions longitudinally along said beam and wherein said recesses are suitable for accepting a counterweight which may be removably placed in any one of said recesses.

21. The scale as defined in claim 14 wherein the height of said stop is such that when a letter is positioned in said letter holding means and when said fulcrum baseline and said stop rest on the generally level surface, the letter is held in a generally vertical orientation.

* * * * *